US009418155B2

(12) United States Patent
Shah et al.

(10) Patent No.: US 9,418,155 B2
(45) Date of Patent: Aug. 16, 2016

(54) DISAMBIGUATION OF ENTITIES

(75) Inventors: Sarthak Deepak Shah, Kirkland, WA (US); Tabreez Govani, Mukilteo, WA (US); Farid Hosseini, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 477 days.

(21) Appl. No.: 12/904,300

(22) Filed: Oct. 14, 2010

(65) Prior Publication Data

US 2012/0096033 A1 Apr. 19, 2012

(51) Int. Cl.
*G06F 17/30* (2006.01)

(52) U.S. Cl.
CPC .............................. *G06F 17/30864* (2013.01)

(58) Field of Classification Search
CPC .............................................. G06F 17/30864
USPC ......... 707/706, 713, 722, 736, 758, 769, 780, 707/781, 999.002–999.006; 705/10; 382/161
See application file for complete search history.

(56) References Cited

U.S. PATENT DOCUMENTS

| 6,405,162 | B1 | 6/2002 | Segond et al. | |
|---|---|---|---|---|
| 7,509,313 | B2 | 3/2009 | Colledge et al. | |
| 7,729,901 | B2 | 6/2010 | Richardson-Bunbury et al. | |
| 8,122,026 | B1 * | 2/2012 | Laroco et al. | 707/737 |
| 2002/0026456 | A1 * | 2/2002 | Bradford | 707/500 |
| 2005/0033627 | A1 * | 2/2005 | Thieme et al. | 705/10 |
| 2005/0080780 | A1 * | 4/2005 | Colledge et al. | 707/4 |
| 2007/0136048 | A1 * | 6/2007 | Richardson-Bunbury et al. | 707/3 |
| 2007/0233656 | A1 | 10/2007 | Bunescu et al. | |
| 2008/0065623 | A1 * | 3/2008 | Zeng et al. | 707/5 |
| 2008/0306935 | A1 * | 12/2008 | Richardson et al. | 707/5 |
| 2009/0144609 | A1 | 6/2009 | Liang et al. | |
| 2010/0036829 | A1 * | 2/2010 | Leyba | 707/5 |
| 2010/0094846 | A1 | 4/2010 | Rouhani-Kalleh et al. | |
| 2010/0145678 | A1 | 6/2010 | Csomai et al. | |
| 2010/0185689 | A1 | 7/2010 | Hu et al. | |

OTHER PUBLICATIONS

Knowledge Lean Word-Sense Disambiguation—Published Date: 2008 http://www.aaai.org/Papers/AAAI/1998/AAAI98-113.pdf.
Word Sense Disambiguation—Retrieved Date: Aug. 10, 2010 http://en.wikipedia.org/wiki/Yarowsky_algorithm.
Improved Semantic Graphs with Word Sense Disambiguation—Retrieved Date: Aug. 10, 2010 http://kcap09.stanford.edu/share/posterDemos/184/paper184.pdf.

* cited by examiner

*Primary Examiner* — Syling Yen
(74) *Attorney, Agent, or Firm* — Dave Ream; Tom Wong; Micky Minhas

(57) ABSTRACT

Methods, systems, algorithms, and media are provided for disambiguating entities present in a received search query. Lists of categories from semi-structured data from external sites as well as internal sources are used to detect if ambiguity exists in an entity within the search query. Multiple senses or categories of the ambiguous entity are determined by ascertaining the primary intent of an entity extracted from a main term of a document. The probability of each sense is calculated by computing a total amount of traffic received for each of the senses of the ambiguous entity. The sense with the highest amount of computed traffic is the most probable determined sense.

20 Claims, 9 Drawing Sheets

| CATEGORY (SENSE) | FREQUENCY | PROBABILITY |
|---|---|---|
| WILL SMITH (ACTOR) | 591,144,470 | 0.989817 |
| WILL SMITH (CHARACTER) | 2,817,990 | 0.004718 |
| WILL SMITH (COMEDIAN) | 1,733,418 | 0.002902 |
| WILL SMITH (AMERICAN FOOTBALL) | 1,268,586 | 0.002124 |
| WILL SMITH (CRICKETER) | 261,641 | 0.000438 |

*FIG. 3*

WILL SMITH (ACTOR)    = 0.989817 PROBABILITY
    ACTOR RESULTS$_1$
    ACTOR RESULTS$_2$
    .
    .
    .
    ACTOR RESULTS$_a$

WILL SMITH (CHARACTER)    = 0.004718 PROBABILITY
    CHARACTER RESULTS$_1$
    CHARACTER RESULTS$_2$
    .
    .
    .
    CHARACTER RESULTS$_b$

WILL SMITH (COMEDIAN)    = 0.002902 PROBABILITY
    COMEDIAN RESULTS$_1$
    .
    .
    .
    COMEDIAN RESULTS$_c$

WILL SMITH (AMERICAN FOOTBALL)    = 0.002124 PROBABILITY
    FOOTBALL RESULTS$_1$
    .
    .
    .
    FOOTBALL RESULTS$_d$

WILL SMITH (CRICKETER)    = 0.000438 PROBABILITY
    CRICKETER RESULTS$_1$
    .
    .
    .
    CRICKETER RESULTS$_e$

*FIG. 3A*

WILL SMITH (ACTOR) = 0.989817 PROBABILITY
ACTOR RESULTS$_1$
ACTOR RESULTS$_2$
.
.
.
.
ACTOR RESULTS$_a$

WILL SMITH (CHARACTER) = 0.004718 PROBABILITY
CHARACTER RESULTS$_1$
CHARACTER RESULTS$_2$
.
.
.
.
CHARACTER RESULTS$_b$

WILL SMITH (COMEDIAN) = 0.002902 PROBABILITY
COMEDIAN RESULTS$_1$
.
.
.
COMEDIAN RESULTS$_c$

WILL SMITH (AMERICAN FOOTBALL) = 0.002124 PROBABILITY
FOOTBALL RESULTS$_1$
.
.
.
FOOTBALL RESULTS$_d$

*FIG. 3B*

WILL SMITH (ACTOR) = 0.989817 PROBABILITY

WILL SMITH (CHARACTER) = 0.004718
WILL SMITH (COMEDIAN) = 0.002902
WILL SMITH (FOOTBALL) = 0.002124
WILL SMITH (CRICKETER) = 0.00438

ACTOR RESULTS$_1$
ACTOR RESULTS$_2$
ACTOR RESULTS$_3$
.
.
.
ACTOR RESULTS$_a$

*FIG. 3C*

DISAMBIGUATION OF ENTITIES

BACKGROUND

A large number of search queries contain one or more terms or entities which are capable of being understood in multiple ways. This requires the search engine to determine when a term might be ambiguous and to ascertain which category or sense the user intended for the ambiguous term.

Some methods and systems rely on a vast gamut of knowledge databases, such as dictionaries and thesauri. The knowledge databases may also contain documents, which can provide a context that is associated with a particular sense of a term. Other methods and systems classify words by assigning a context probability to a particular meaning. However, these methods and systems do not account for user preferences or patterns in determining the most probable sense of an ambiguous term or entity.

SUMMARY

Embodiments of the invention are defined by the claims below. A high-level overview of various embodiments of the invention is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

Embodiments of the invention include a computer-implemented method of disambiguating entities. The method includes determining when a received search query might be ambiguous. Categorized lists derived either directly or inferrerd from semi-structured data are utilized, such as internal and external categorized lists. If ambiguity was detected for any entities within the received search query, then the specific senses of the ambiguous entities are determined. These senses are determined by extracting the ambiguous entity from one or more documents to ascertain its primary intent within the text of the document. A probability is calculated for each of the determined senses by computing a total amount of network traffic received for each determined sense of the ambiguous entity. The most probable determined sense would be the sense with the highest amount of computed network traffic. Returned search results contain content for the most probable determined sense of the ambiguous entity. An embodiment of the invention provides search results content that is proportional to the calculated probability of each determined sense. Another embodiment of the invention provides content for all determined senses with a probability above a minimum probability threshold level and omitting content for all determined senses with a probability below the minimum probability threshold level. Another embodiment of the invention provides content for the most probable determined sense and provides a link to all other defined senses of the ambiguous entity.

Other embodiments of the invention include a computer-implemented method of detecting an ambiguous search query. The method includes receiving a search query from a user input, and identifying any ambiguous terms in the query by utilizing lists of categories from semi-structured data. Categories of the ambiguous term are inferred by using extraction methods on the semi-structured data. A probability of each inferred category is determined from web browser data. The web browser data contains a number of page views and the dwell time for each page view. The probability can then be determined by measuring an amount of computing traffic for the page views. Search results are returned containing content for the most probable determined category of the ambiguous term. An embodiment of the invention provides search results content for the most probable category which exceeds a maximum probability threshold. Another embodiment of the invention provides content for all inferred categories with a probability above a minimum probability threshold level and omits content for all inferred categories with a probability below the minimum probability threshold level. Another embodiment of the invention provides content that is proportional to the determined probability of each of the inferred categories.

Other embodiments of the invention include computer-readable storage media, having instructions stored thereon, that when executed by a computing device, perform the above-described methods of disambiguating entities and detecting an ambiguous search query.

Other embodiments of the invention include one or more computer-readable storage media containing computer readable instructions for an algorithm embodied thereon that, when executed by a computing device, perform steps for disambiguating entities. The algorithm includes detecting if ambiguity exists for an entity obtained from a search query. The ambiguity can be detected when an entity appears in multiple categorized lists. Multiple senses are determined for the ambiguous entity, and a total amount of network traffic is computed for each of the determined senses. A probability is calculated for each sense by dividing the computed network traffic for each sense by the combined amount of computed network traffic for all determined senses of the ambiguous entity. The calculated probability utilizes web browser page views and dwell times for each of the page views.

BRIEF DESCRIPTION OF THE DRAWINGS

Illustrative embodiments of the invention are described in detail below, with reference to the attached drawing figures, which are incorporated by reference herein, and wherein:

FIGS. 3, 3A, 3B, and 3C are tables illustrating calculated probability results for senses used in accordance with embodiments of the invention;

DETAILED DESCRIPTION

Figure 1:
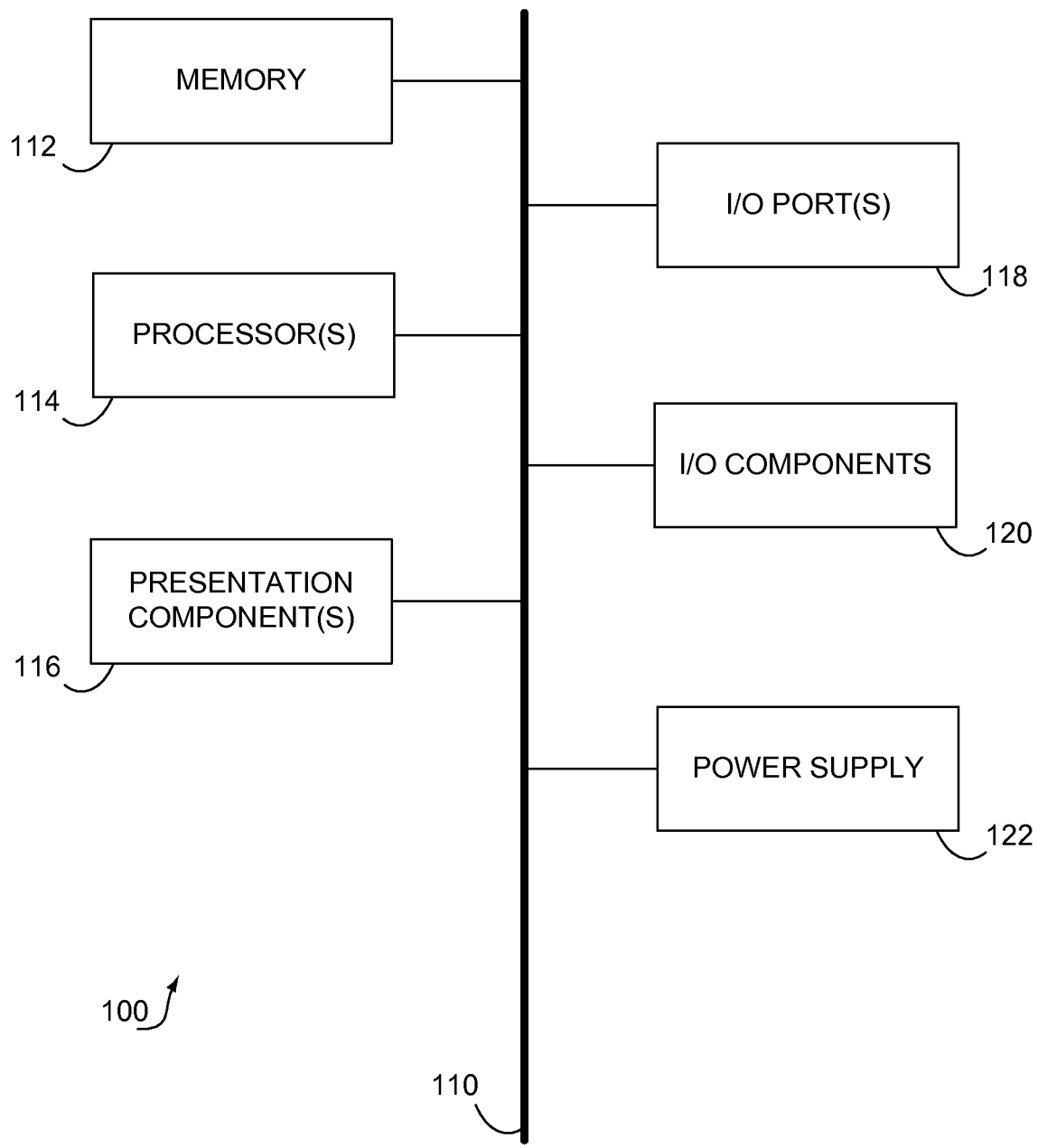
FIG. 1 is a block diagram illustrating an exemplary computer operating system used in accordance with embodiments of the invention.

Embodiments of the invention provide systems, methods and computer-readable storage media for disambiguation of entities. This detailed description and the following claims satisfy the applicable statutory requirements.

The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Embodiments of the invention include, without limitation, methods, systems, algorithms, and sets of computer-executable instructions embodied on one or more computer-readable media. Computer-readable media include both volatile and nonvolatile media, removable and non-removable media, and media readable by a database and various other network devices. By way of example and not limitation, computer-readable storage media comprise media implemented in any method or technology for storing information. Examples of stored information include computer-useable instructions, data structures, program modules, and other data representations. Media examples include, but are not limited to information-delivery media, random access memory (RAM), read-only memory (ROM), electrically erasable programmable read-only memory (EEPROM), flash memory or other memory technology, compact-disc read-only memory (CD-ROM), digital versatile discs (DVD), Blu-ray disc, holographic media or other optical disc storage, magnetic cassettes, magnetic tape, magnetic disk storage, and other magnetic storage devices. These examples of media can be configured to store data momentarily, temporarily, or permanently. The computer-readable media include cooperating or interconnected computer-readable media, which exist exclusively on a processing system or distributed among multiple interconnected processing systems that may be local to, or remote from, the processing system.

Embodiments of the invention may be described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network, such as the Internet.

In some embodiments, a computer-implemented method of disambiguating entities using a computing system having processor, memory, and data storage subsystems is described. The computer-implemented method comprises receiving a user input search query, detecting if ambiguity exists in an entity within the search query, determining multiple senses that exist within the detected ambiguous entity, calculating the probability of each determined sense of the detected ambiguous entity, and returning search results for a most probable determined sense of the detected ambiguous entity. One or more computer-readable storage media containing computer readable instructions embodied thereon that, when executed by a computing device, perform the above-cited method of disambiguating entities is also described as an embodiment of the invention.

In other embodiments, one or more computer-readable storage media containing computer readable instructions for an algorithm embodied thereon that, when executed by a computing device, perform steps for disambiguating entities is described. The algorithm comprises detecting if ambiguity exists for an entity obtained from a search query, determining senses that exist within the detected ambiguous entity, computing a total amount of network traffic for each of the determined senses, and calculating a probability for each of the determined senses of the detected ambiguous entity via the processor of the computing device.

In yet other embodiments, a computer-implemented method of detecting an ambiguous search query using a computing system having processor, memory, and data storage subsystems is also described. The computer-implemented method comprises receiving a search query from a user input via an interconnected computing network of the computing system, identifying an ambiguous term in the search query by utilizing lists of categories from semi-structured data containing the ambiguous term, inferring categories of the identified ambiguous term via extraction on the semi-structured data, determining a probability for each inferred category of the identified ambiguous term from web browser data via the processor of the computing system, and returning search results representing a most probable determined category of the identified ambiguous term to a user via a graphical user interface of the computing system. One or more computer-readable storage media containing computer readable instructions embodied thereon that, when executed by a computing device, perform the above-cited method of detecting an ambiguous search query is also described as an embodiment of the invention.

Having briefly described a general overview of the embodiments herein, an exemplary computing system is described below. Referring initially to FIG. 1, an exemplary operating environment for implementing embodiments of the present invention is shown and designated generally as computing device 100. The computing device 100 is but one example of a suitable computing system and is not intended to suggest any limitation as to the scope of use or functionality of embodiments of the invention. Neither should the computing device 100 be interpreted as having any dependency or requirement relating to any one or combination of components illustrated. In one embodiment, the computing device 100 is a conventional computer (e.g., a personal computer or laptop). Embodiments of the invention are also applicable to a plurality of interconnected computing devices, such as computing devices 100.

The computing device 100 includes a bus 110 that directly or indirectly couples the following devices: memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, delineating various components in reality is not so clear, and metaphorically, the lines would more accurately be gray and fuzzy. For example, one may consider a presentation component 116 such as a display device to be an I/O component 120. Also, processors 114 have memory 112. It will be understood by those skilled in the art that such is the nature of the art, and as previously mentioned, the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1, and are referenced as "computing device" or "computing system."

The computing device 100 can include a variety of computer-readable media. By way of example, and not limitation, computer-readable media may comprise RAM, ROM, EEPROM, flash memory or other memory technologies, CDROM, DVD or other optical or holographic media, magnetic cassettes, magnetic tape, magnetic disk storage or other magnetic storage devices, or similar tangible media that are configurable to store data and/or instructions relevant to the embodiments described herein.

The memory 112 includes computer-storage media in the form of volatile and/or nonvolatile memory. The memory 112 may be removable, non-removable, or a combination thereof. Exemplary hardware devices include solid-state memory, hard drives, cache, optical-disc drives, etc. The computing device 100 includes one or more processors 114, which read data from various entities such as the memory 112 or the I/O components 120. The presentation components 116 present data indications to a user or other device. Exemplary presentation components 116 include display devices, speaker devices, printing devices, vibrating devices, and the like.

The I/O ports 118 logically couple the computing device 100 to other devices including the I/O components 120, some of which may be built in. Illustrative I/O components 120 include a microphone, joystick, game pad, satellite dish, scanner, printer, wireless device, etc.

The components described above in relation to the computing device 100 may also be included in a wireless device. A wireless device, as described herein, refers to any type of wireless phone, handheld device, personal digital assistant (PDA), BlackBerry®, smartphone, digital camera, or other mobile devices (aside from a laptop), which communicate wirelessly. One skilled in the art will appreciate that wireless devices will also include a processor and computer-storage media, which perform various functions. Embodiments described herein are applicable to both a computing device and a wireless device. In embodiments, computing devices can also refer to devices which run applications of which images are captured by the camera in a wireless device.

Figure 2:
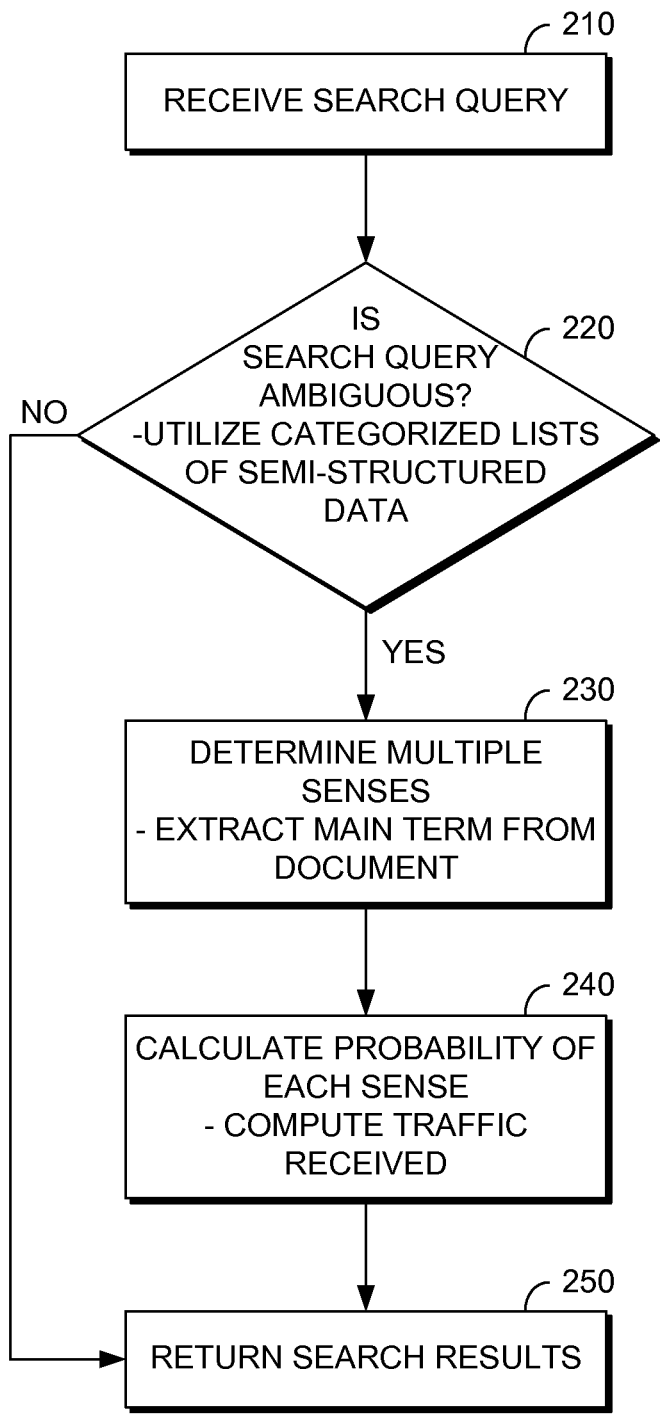
FIG. 2 is a flow diagram for a method of disambiguating entities used in accordance with embodiments of the invention.

The computing system described above is configured to be used with the several computer-implemented methods, algorithms, systems, and media for disambiguating entities generally described above and described in more detail hereinafter. FIG. 2 is a flow diagram for a method of disambiguating entities according to embodiments of the invention. A search query is received in step 210 from a user input using a computing system, such as the computing system described in FIG. 1 above. However, any computing system is contemplated within embodiments of the invention. Many times, it is difficult for a search engine to determine what a user is actually searching for because one or more entities in the search query may be ambiguous. Ambiguity is defined here as a term or entity that is capable of being understood in two or more possible ways. As a result, multiple categories or senses exist for a single term or entity. Therefore, the search engine needs to determine if there are any possible ambiguous entities in the search query in step 220. Certain tools can be utilized in order to determine this, such as categorized lists of semi-structured data. Categorized lists of published traffic data can be found from various Internet sites, and can also be returned to a site by users of that site. Internal semi-structured data can also be used in conjunction with the published traffic data. However, embodiments of the invention are not limited to any particular source of categorized lists of semi-structured data. An example of a categorized list is "Will Smith," which might include senses of actor, character, comedian, American football, and cricketer. If it was determined that multiple senses existed for one or more entities in the obtained search query, then the specific senses for each ambiguous entity are determined in step 230. This can be accomplished by extracting the ambiguous entity from a document and associating text surrounding the ambiguous entity to ascertain its primary intent and to determine its most probable meaning. The probability for each particular sense of an entity is calculated in step 240.

Using web browser data, traffic patterns can be determined for each page representing a particular sense and what the probability is for that particular sense. The number of page views and the dwell time for each page view are utilized to determine each probability. The most probable sense is determined to be the sense with the highest amount of computed network traffic. Search results are returned to the user in step 250, which includes results of the most probable determined sense for the one or more ambiguous entities. If there were no ambiguous entities found in step 220, then search results would be returned at step 250.

FIG. 3 is a table showing the calculated probability results for the senses of "Will Smith," along with the definitions of each of the senses using the above-described method. In this example, the largest probable sense for Will Smith is directed to the actor sense, which has a calculated confidence or probability rating of approximately 98.98%. Modest probabilities were obtained for the character sense (approximately 4.7%), the comedian sense (approximately 2.9%), and the American football sense (approximately 2.1%), while a very small probability was obtained for the cricketer sense (approximately 0.04%).

Search results can be organized in a variety of embodiments for presentation to the user, based upon the calculated probabilities of the determined senses. FIG. 3A illustrates search results for all categories of Will Smith found. The amount of content presented for each sense is proportional to the calculated probability determined for each of the multiple senses. The actor sense is presented first and correlates to approximately 98.98% of all of the search results content presented. A proportional amount of search results content is also presented for each of the remaining senses. FIG. 3A illustrates that for this particular example, the total amount of results for the actor sense, represented by "a" is much greater than the total amount of results for the character sense, which is represented by "b". Likewise, the total amount of results for the character sense is greater than the total amount of results for the comedian sense, represented by "c", and the total amount of results for the comedian sense is greater than the total amount of results for the American football sense, represented by "d". FIG. 3A also illustrates that the total amount of results for the American football sense is much greater than the total amount of results for the cricketer sense, represented by "e". Therefore, the proportional amount of search results content that is presented for all five senses of Will Smith in this example illustrate that a >>b>c>d>>e.

In the example of determined senses for Will Smith, it may also be determined that the cricketer sense has such a small probability of being the intended sense, that those results can be omitted. FIG. 3B illustrates the same presented results as FIG. 3A, except that the search results for the cricketer sense have been omitted. In this embodiment, a minimum probability threshold can be established, in which search results for any determined senses with probabilities lying below a minimum probability threshold level will not be presented.

FIG. 3C illustrates another embodiment for presentation of search results content. Since the actor determined sense had a much higher probability than even the second most probable sense, the majority of presentational viewing area is allotted to content for the actor sense search results. In this embodiment, a maximum probability threshold can be established, in which the primary viewing area is allotted to search results content for the most probable sense that exceeded a maximum probability threshold level. Embodiments for two or more primary senses are also contemplated, in which a single probable sense did not exceed a maximum probability threshold level. In this case, the primary viewing area would be allotted for search results content directed to the two or more primary determined senses. A module is also given with a link to content for the search results for all of the other determined senses, as well as a definition of each sense.

Figure 4:
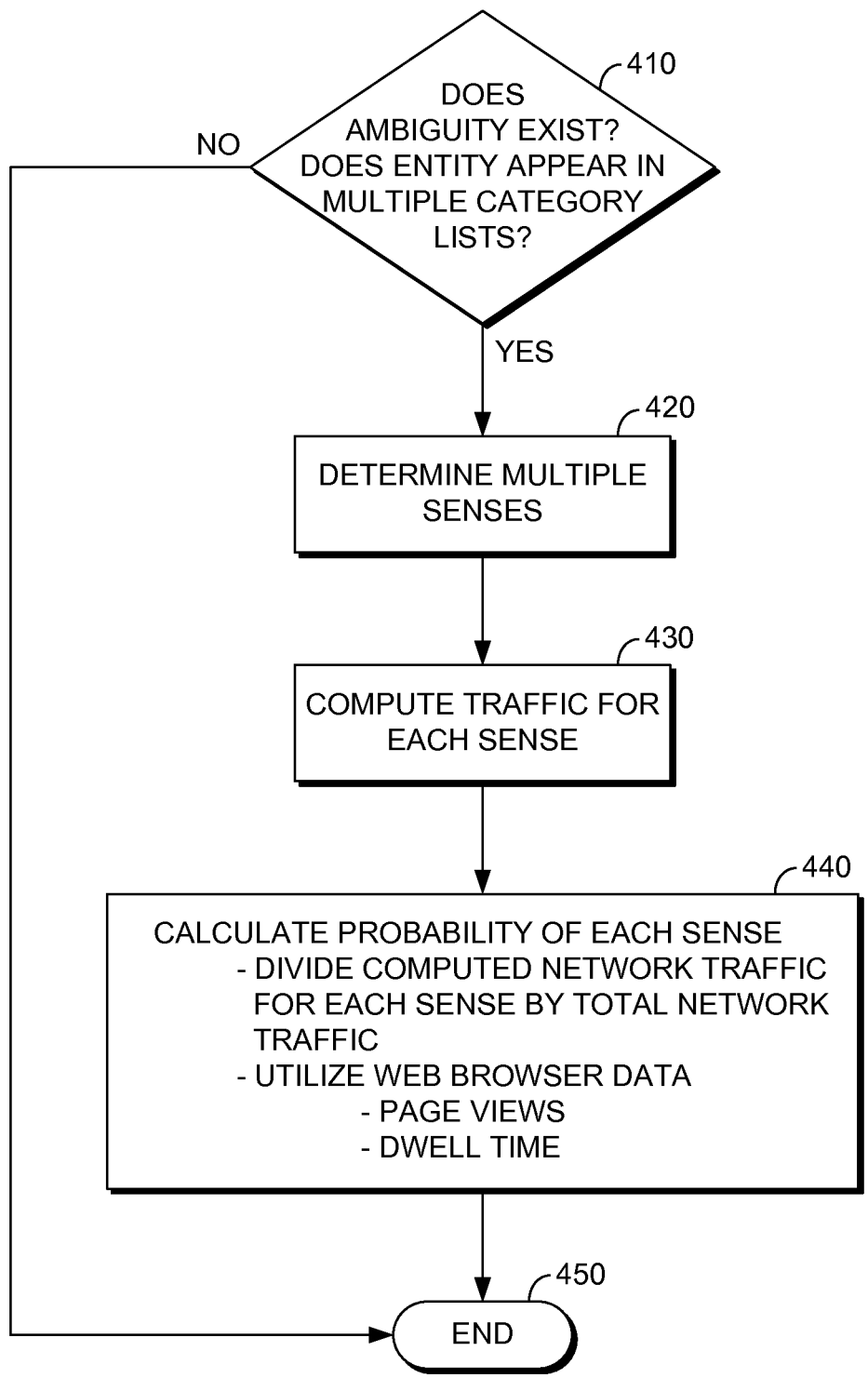
FIG. 4 is a flow diagram for an algorithm used in accordance with embodiments of the invention.

FIG. 4 is a flow diagram for one or more computer-readable storage media containing computer readable instructions for an algorithm embodied thereon that, when executed by a computing device, perform the following steps for disambiguating entities. The algorithm begins in step 410 by detecting if any ambiguities exist for an entity obtained from a search query. The ambiguities can be detected by identifying an entity that appears in multiple categorized lists. The specific senses within the detected ambiguous entity are determined in step 420. Network traffic for each determined sense is computed in step 430. The probability of each sense is calculated in step 440. Using web browser data, traffic patterns can be determined for each page representing a particular sense and what the probability is for that particular sense. The number of page views and the dwell time for each page view are utilized to determine each probability. The probability can be calculated by dividing the computed network traffic for a particular determined sense by the total amount of computed network traffic for all determined senses of the ambiguous entity. The most probable sense is determined to be the sense with the highest amount of computed network traffic. The algorithm ends at this point or after it was determined in step 410 that no ambiguity existed, as designated by step 450.

Figure 5:
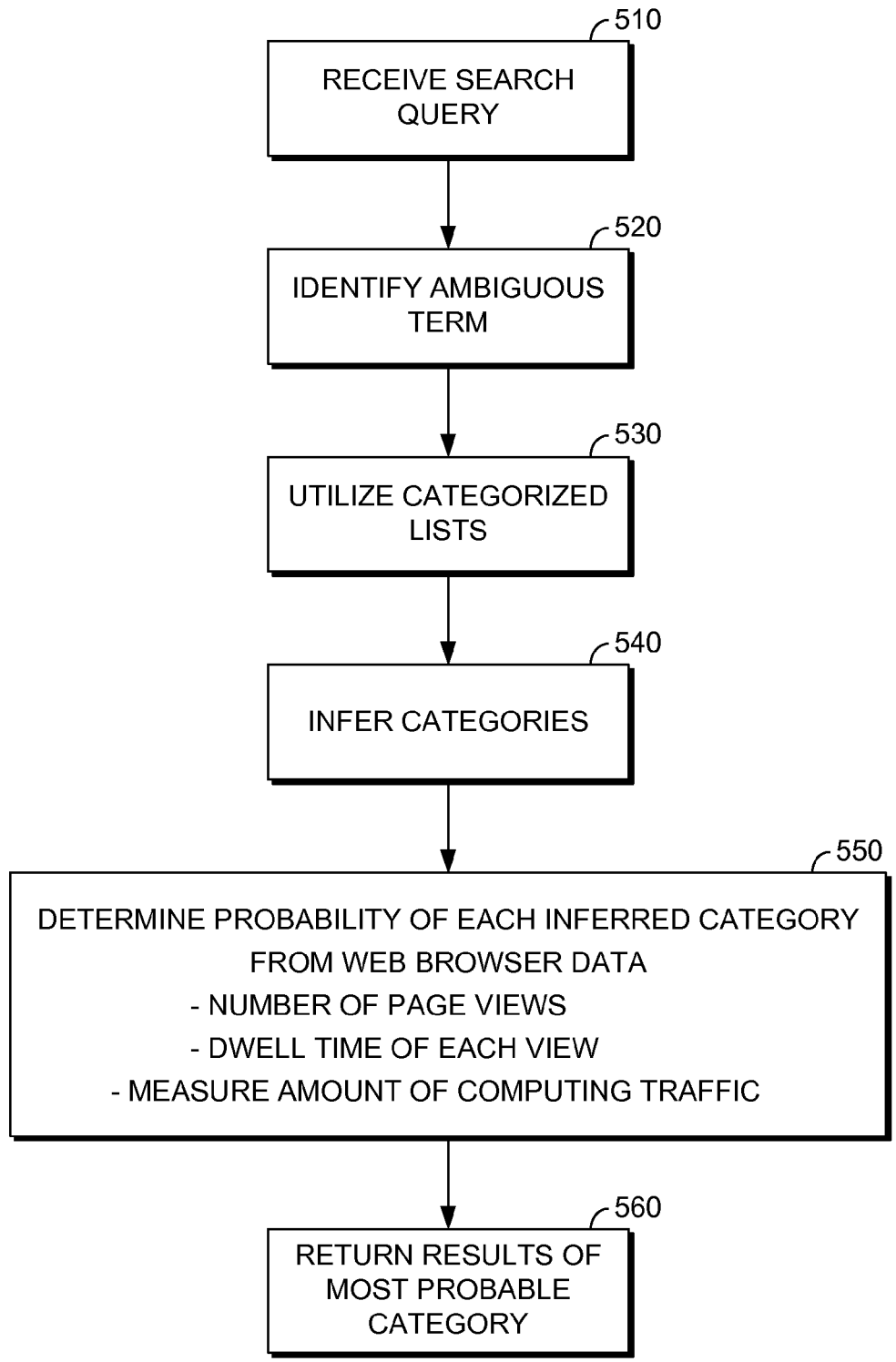
FIGS. 5 and 5A are flow diagrams of a method of detecting an ambiguous search query used in accordance with embodiments of the invention.

FIG. 5 is a flow diagram of a method of detecting an ambiguous search query. A search query is received in step 510 from a user input by way of an interconnected computing network of a computing system, such as the computing system described in FIG. 1 above. An interconnected computing network could be a LAN, a WAN, or the Internet for example. However, any computing network in combination with any computing system is contemplated within embodiments of the invention. Any ambiguous terms are identified within the search query in step 520. An ambiguous term can be identified using internal or external categorized lists from semi-structured data which contain the ambiguous term, as designated in step 530. Extraction techniques can be used to extract the main term from a document, and thereby infer its primary intent in step 540. A probability of each inferred category of the ambiguous term is determined in step 550. Dwell times of each page view and the total number of page views from web browser data are used to measure the amount of network computing traffic for the page views representing each category. Search results that represent a most probable determined category of the ambiguous term are returned to a user via a graphical user interface of the computing system in step 560.

Figure 5A:
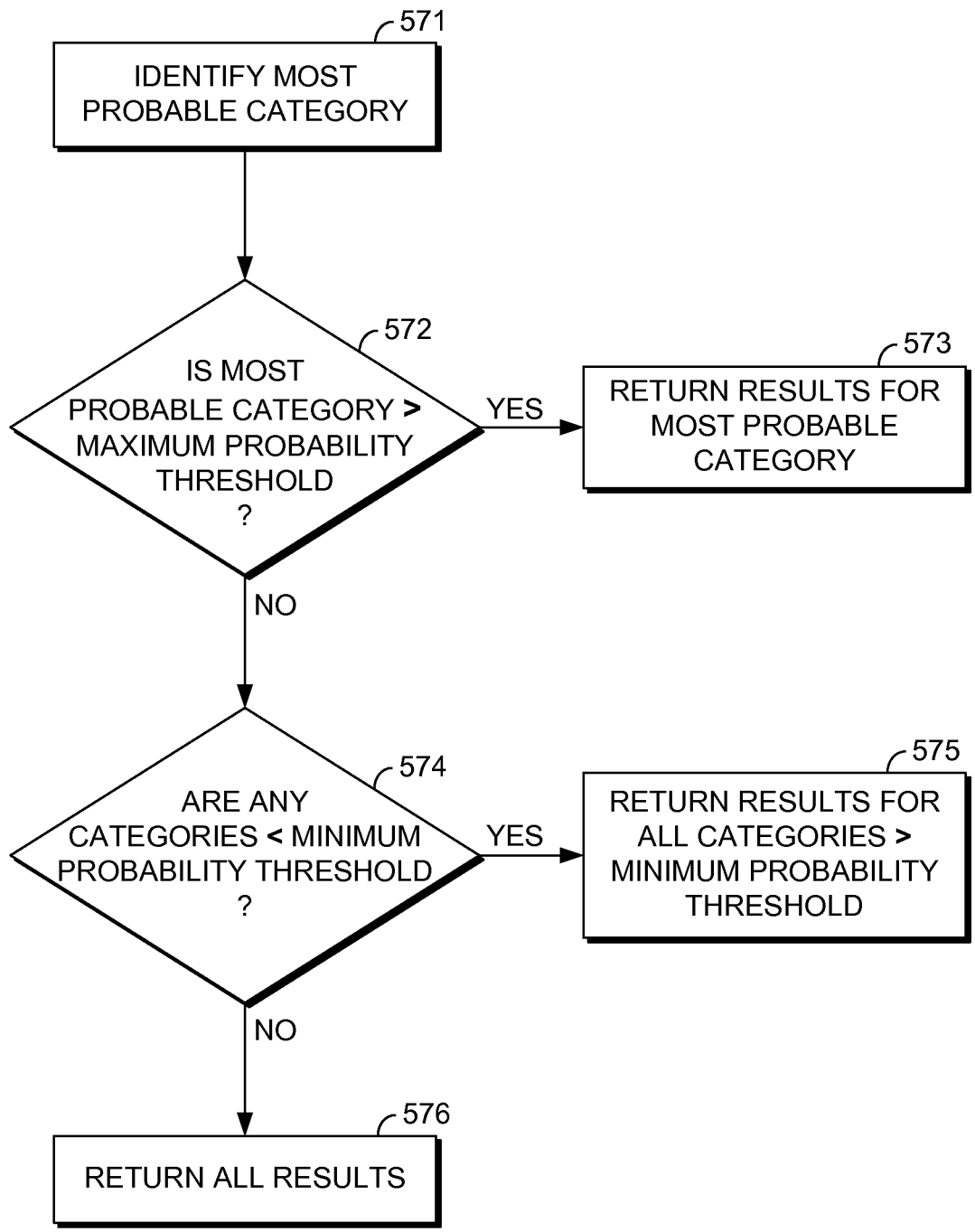

FIG. 5A is a flow diagram which represents some embodiments of the invention for presenting the search results of step 560. FIG. 5A is not all-encompassing, and many other presentation embodiments are contemplated within the invention. A most probable category is identified in step 571. In the previous example given with reference to FIG. 3, the actor category was the most probable determined category for the "Will Smith" ambiguous term. In step 572, a decision is made as to whether the probability of the most probable category is greater than a particular maximum probability threshold. The maximum probability threshold could be a pre-determined value or a value determined later based upon the probability results. In the "Will Smith" ambiguous category example of FIG. 3, the actor category has a much higher probability of being the intended category of the search query than the character category with the second highest probability. Therefore, the probability for the actor category could be above the maximum probability threshold level, and results for the most probable category (actor, in this example) are returned to the user in step 573. If the probability of the most probable category is not greater than the maximum probability threshold, then another decision is made to determine if the probability of any of the inferred categories is below a minimum probability threshold level in step 574. If the probabilities for one or more inferred categories are below this minimum probability threshold level, then results for the inferred categories with probabilities below the minimum probability threshold level may not be presented. Only results for inferred categories having a probability above the minimum probability threshold level may be returned to the user in step 575. If there are no inferred category probabilities below the minimum probability threshold level, then all results for all inferred categories are returned to the user in step 576. An embodiment of the invention presents the results in probability order with a proportional amount of content given to each inferred category that is presented.

Many different arrangements of the various components depicted, as well as embodiments not shown, are possible without departing from the spirit and scope of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of disambiguating entities using a computing system having processor, memory, and data storage subsystems, the computer-implemented method comprising:

receiving a user input search query;

detecting that ambiguity exists in an entity within the search query;

determining multiple senses that exist within the detected ambiguous entity;

for each of the multiple senses, computing an amount of network traffic to a webpage that represents one of the multiple senses, wherein computing includes calculating a number of webpage views of the webpage and a dwell time for each of the webpage views of the webpage;

computing a total amount of network traffic to all webpages that represent at least one of the multiple senses;

for each of the multiple senses, calculating a probability based on the amount of network traffic to the webpage that represents the one of the multiple senses and the total amount of network traffic to all the webpages that represent at least one of the multiple senses;

identifying a most probable sense of the multiple senses of the detected ambiguous entity, wherein the most probable sense has a highest probability compared to remaining senses of the multiple senses of the detected ambiguous entity; and returning search results for the most probable sense of the multiple senses of the detected ambiguous entity based on the probability calculated for each of the multiple senses from the amount of network traffic to the webpage that represents the one of the multiple senses and the total amount of network traffic to all the webpages that represent at least one of the multiple senses.

2. The computer-implemented method of claim 1, wherein said detecting utilizes lists of categories from semi-structured data.

3. The computer-implemented method of claim 1, wherein each of the determined multiple senses are determined by extracting a main term from a document to ascertain its primary intent.

4. The computer-implemented method of claim 1, wherein a viewing area allotted to the returned search results is proportional to the calculated probability of each of the multiple senses.

5. The computer-implemented method of claim 1, wherein the returned search results comprise content for all determined multiple senses with a probability above a minimum probability threshold level and omits content for all determined multiple senses with a probability below the minimum probability threshold level.

6. The computer-implemented method of claim 1, wherein the returned search results comprise content for the most probable determined sense and a module comprising links to all other determined multiple senses of the detected ambiguous entity.

7. The computer-implemented method of claim 6, wherein the module further comprises definitions of the other determined multiple senses.

8. The computer-implemented method of claim 1, wherein the calculating a probability further includes dividing the amount of network traffic to the webpage that represents the one of the multiple senses by the total amount of network traffic to all the webpages that represent at least one of the multiple senses.

9. One or more computer hardware storage media containing computer readable instructions for an algorithm embodied thereon that, when executed by a computing device, perform steps for disambiguating entities, the algorithm comprising:
    detecting that ambiguity exists for an entity obtained from a search query;
    determining senses that exist within the detected ambiguous entity;
    for each of the senses, computing an amount of network traffic to a webpage that represents one of the senses, wherein computing includes calculating a number of webpage views of the webpage and a dwell time for each of the webpage views of the webpage;
    computing a total amount of network traffic to all webpages that represent at least one of the senses;
    for each of the senses, calculating a probability based on the amount of network traffic to the webpage that represents the one of the senses and the total amount of network traffic to all the webpages that represent at least one of the senses;
    identifying a most probable sense of the senses, wherein the most probable sense has a highest probability compared to remaining senses of the detected ambiguous entity; and
    returning search results for the most probable sense of the senses of the detected ambiguous entity based on the probability calculated for each of the senses from the amount of network traffic to the webpage that represents the one of the senses and the total amount of network traffic to all the webpages that represent at least one of the senses.

10. The one or more computer hardware storage media of claim 9, wherein the ambiguity is detected when an entity appears in multiple categorized lists.

11. The media of claim 9, further comprising returning search results comprising content for all of the senses having a probability above a minimum probability threshold level.

12. The media of claim 11, where the minimum probability threshold level is predetermined or dynamic.

13. The media of claim 9, further comprising comparing the probability of each of the senses to one another.

14. A computerized system comprising:
    one or more processors; and
    a non-transitory computer storage media storing computer-useable instructions that, when used by the one or more processors, cause the one or more processors to:
    receive a search query from a user input via an interconnected computing network of the computing system;
    identify an ambiguous term in the search query by utilizing lists of categories from semi-structured data containing the ambiguous term;
    infer categories of the ambiguous term via extraction on the semi-structured data;
    for each of the categories inferred for the ambiguous term, compute an amount of network traffic, wherein computing includes calculating a number of webpage views representing each category and a dwell time for each of the webpage views;
    compute a total amount of network traffic to all of the webpages representing the categories inferred;
    determine a probability for each category of the ambiguous term based on the amount of network traffic computed for each of the categories and the total amount of network traffic computed for all categories inferred of the ambiguous entity;
    identify a most probable category of the ambiguous term, wherein the most probable category has a highest probability compared to remaining categories of the ambiguous term; and
    return search results representing the most probable category of the ambiguous term to a user via a graphical user interface of the computing system based on the probability calculated for each category of the ambiguous term from the amount of network traffic computed for each of the categories and the total amount of network traffic computed for all categories inferred of the ambiguous entity.

15. The system of claim 14, wherein the semi-structure data containing the ambiguous term includes internal categorized list data and external categorized list data including published traffic data.

16. The system of claim 14, wherein the search results returned comprise content for all categories having a probability above a minimum probability threshold level.

17. The system of claim 14, wherein the search results returned are allotted a presentation area that is proportional to the probability of the category to which each of the search results belong.

18. The system of claim 14, wherein the non-transitory computer storage media further causes the one or more processors to:
    for each of the categories inferred, extract a main term from a document to ascertain a primary intent of the document.

19. The system of claim 14, wherein the non-transitory computer storage media further causes the one or more processors to:
    omit content for categories inferred having a probability below a minimum probability threshold level.

20. The system of claim 14, wherein a dwell time is an amount of time a user spends viewing a webpage.

* * * * *